United States Patent
Ogino

(10) Patent No.: US 10,638,088 B2
(45) Date of Patent: Apr. 28, 2020

(54) TRANSFER CONTROL APPARATUS, CONTROL METHOD, AND MIXED-REALITY PRESENTATION APPARATUS

(71) Applicant: CANON KABUSHIKI KAISHA, Tokyo (JP)

(72) Inventor: Kaoru Ogino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/540,706

(22) PCT Filed: Jan. 22, 2016

(86) PCT No.: PCT/JP2016/000316
§ 371 (c)(1),
(2) Date: Jun. 29, 2017

(87) PCT Pub. No.: WO2016/139882
PCT Pub. Date: Sep. 9, 2016

(65) Prior Publication Data
US 2018/0007312 A1  Jan. 4, 2018

(30) Foreign Application Priority Data

Mar. 3, 2015 (JP) .................................. 2015-041776
Nov. 20, 2015 (JP) .................................. 2015-228095

(51) Int. Cl.
*H04N 7/10* (2006.01)
*H04B 10/25* (2013.01)
(Continued)

(52) U.S. Cl.
CPC .............. *H04N 7/10* (2013.01); *G02B 27/01* (2013.01); *G02B 27/017* (2013.01); *H04B 10/25* (2013.01);
(Continued)

(58) Field of Classification Search
CPC ......... H04N 7/10; H04N 7/0117; H04B 10/25
See application file for complete search history.

(56) References Cited

U.S. PATENT DOCUMENTS

| | | | | |
|---|---|---|---|---|
| 2011/0150401 A1* | 6/2011 | Furuyama | ............ | H04B 10/801 385/89 |
| 2013/0089147 A1* | 4/2013 | Izumi | ................ | H04N 21/4307 375/240.12 |
| 2014/0292811 A1* | 10/2014 | Takayama | ............ | G06T 19/006 345/633 |

FOREIGN PATENT DOCUMENTS

| | | | |
|---|---|---|---|
| JP | 2001160777 A | 6/2001 | |
| JP | 2004179733 A | 6/2004 | |

(Continued)

OTHER PUBLICATIONS

Written Opinion and International Search Report issued in parent International Application No. PCT/JP2016/000316 dated Apr. 19, 2016.

(Continued)

*Primary Examiner* — Michael E Teitelbaum
(74) *Attorney, Agent, or Firm* — Venable LLP

(57) ABSTRACT

A transfer control apparatus transfers video data obtained by image capturing in an image capturing and displaying apparatus to an image processing apparatus, and transfers video data generated by the image processing apparatus to the image capturing and displaying apparatus. In the transfer control apparatus, a first converter outputs an optical signal converted from an electrical signal representing the video data, an optical fiber transfers the optical signal, a second converter outputs an electrical signal converted from the optical signal transferred by the optical fiber, and a metal wire transfers a control signal indicating whether it is possible to communicate the video data by a communication unit of the image capturing and displaying apparatus. Opera- (Continued)

tions of the first and second converters are controlled based on the control signal.

7 Claims, 7 Drawing Sheets

(51) Int. Cl.
  *H04N 7/01* (2006.01)
  *G02B 27/01* (2006.01)
  *H04N 13/00* (2018.01)
  *H04N 21/41* (2011.01)
  *H04N 13/344* (2018.01)
(52) U.S. Cl.
  CPC ....... *H04B 10/2504* (2013.01); *H04N 7/0117* (2013.01); *H04N 13/344* (2018.05); *H04N 21/4122* (2013.01); *G02B 2027/0178* (2013.01)

(56) References Cited

FOREIGN PATENT DOCUMENTS

| JP | 2007306213 A | 11/2007 |
|----|--------------|---------|
| JP | 2011-130297 A | 6/2011 |
| JP | 2014199532 A | 10/2014 |
| WO | 2012105440 A1 | 8/2012 |

OTHER PUBLICATIONS

Japanese Office Action issued in corresponding Japanese Application No. 2015228095 dated Aug. 2, 2019.

* cited by examiner

[Fig. 1]
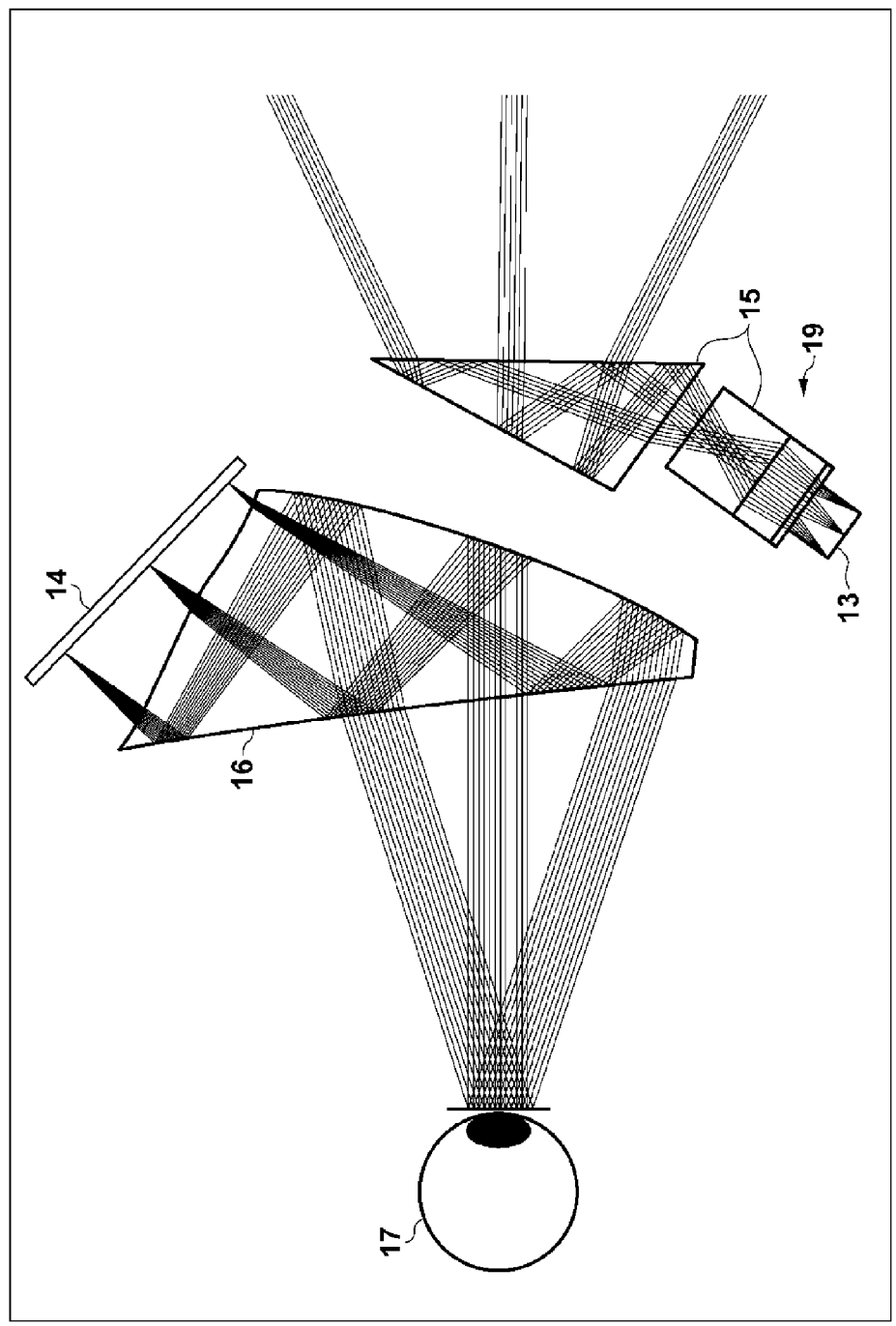

[Fig. 2]
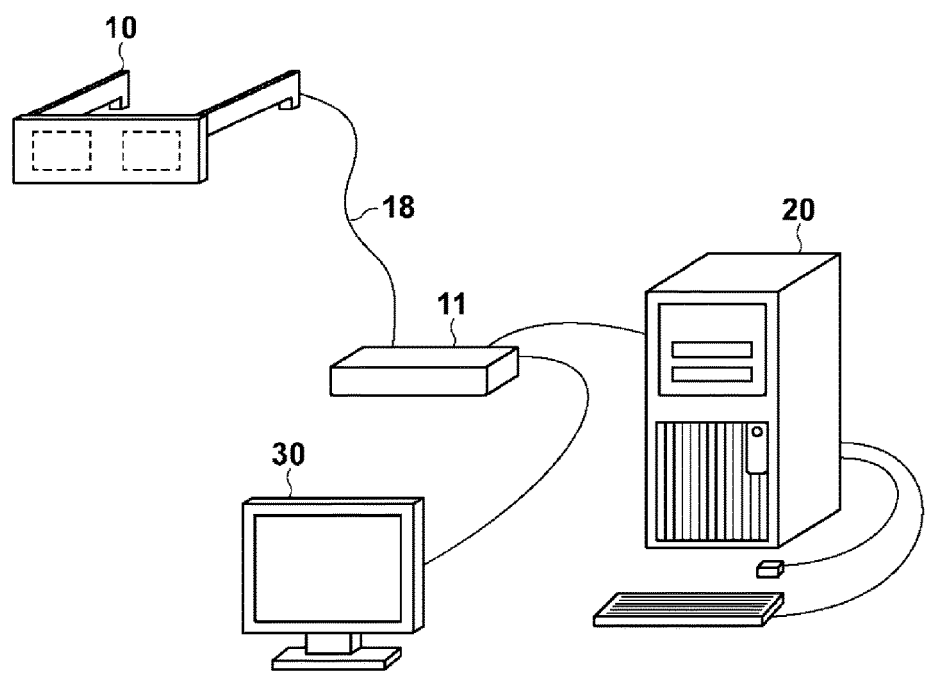

[Fig. 3]
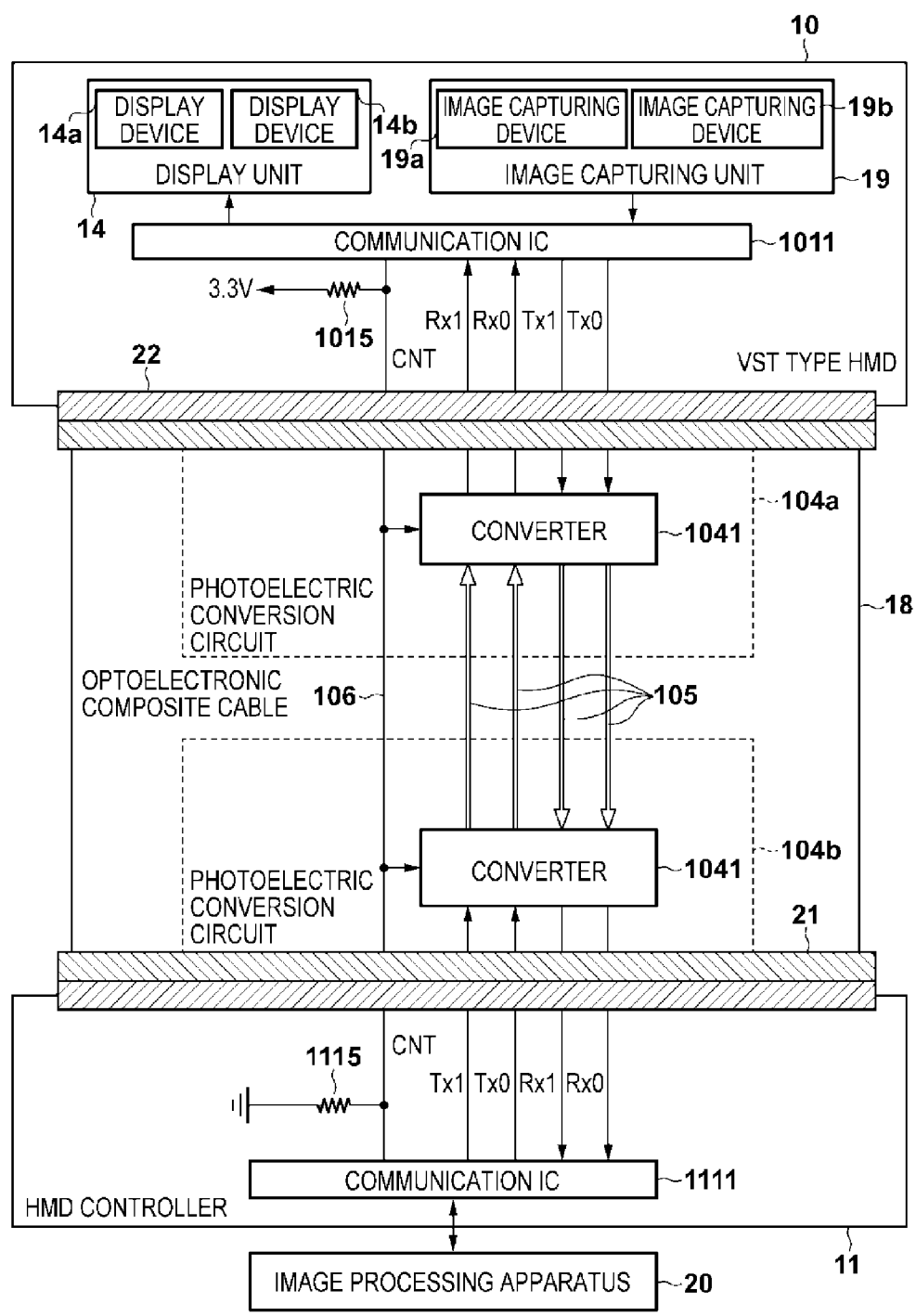

[Fig. 4]
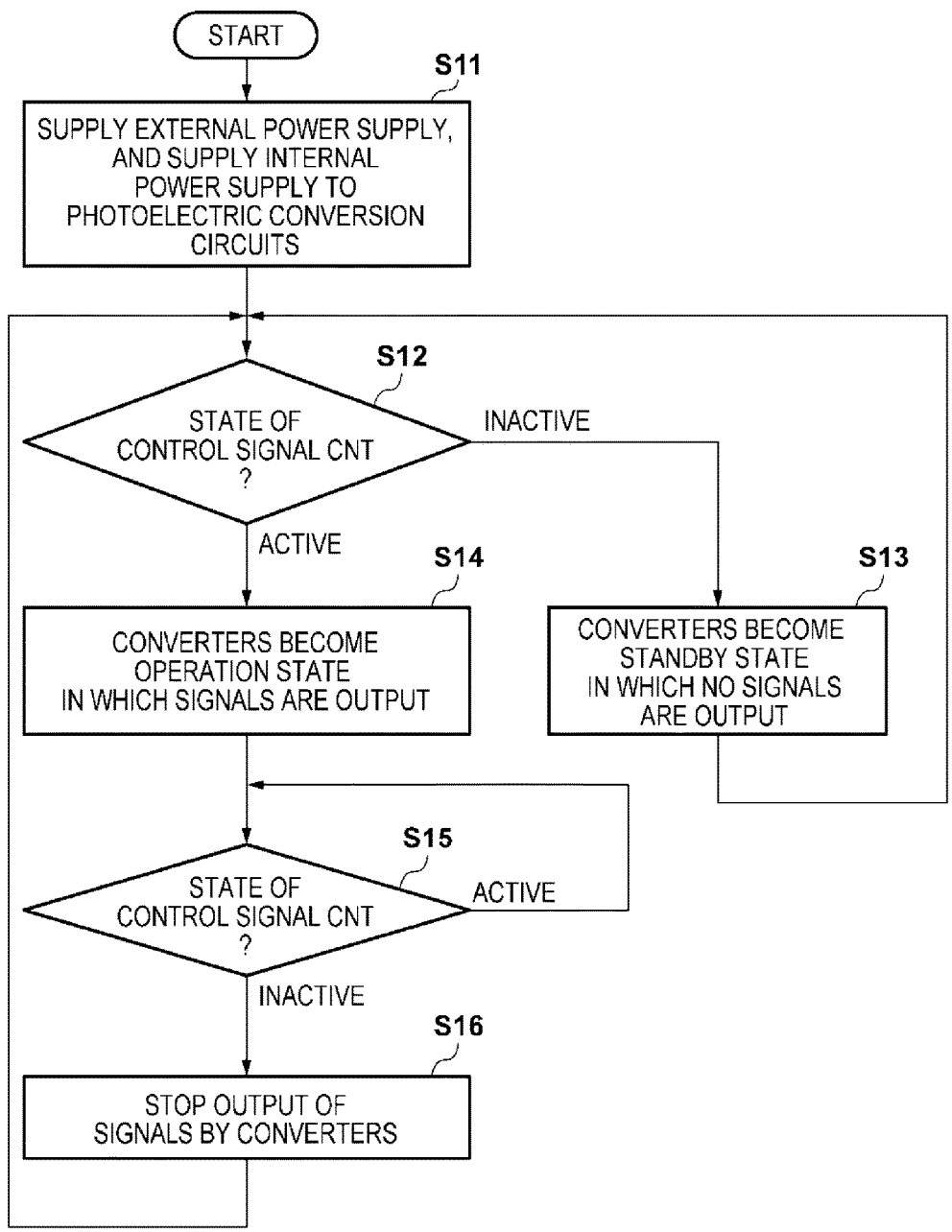

[Fig. 5]
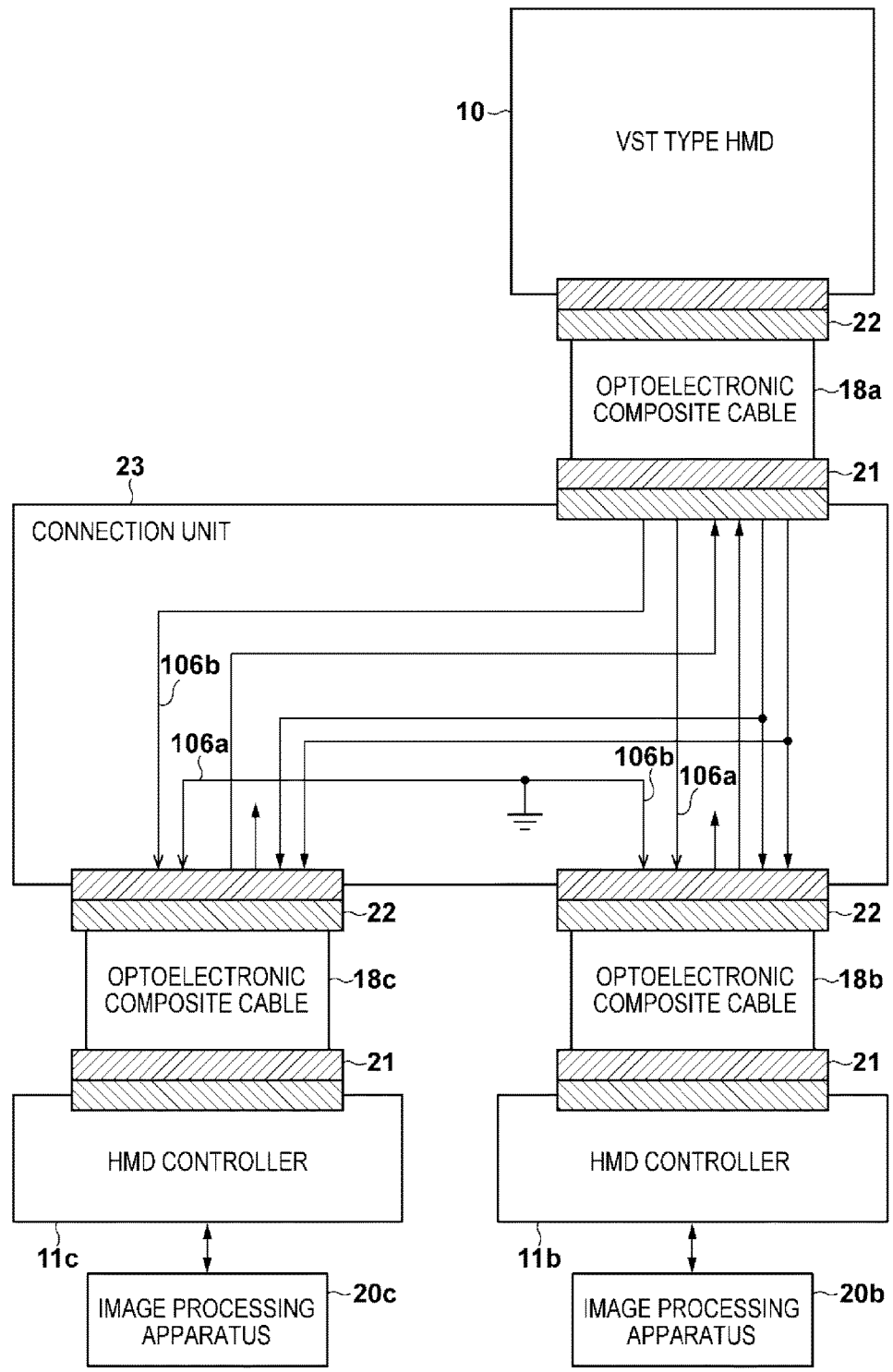

[Fig. 6]
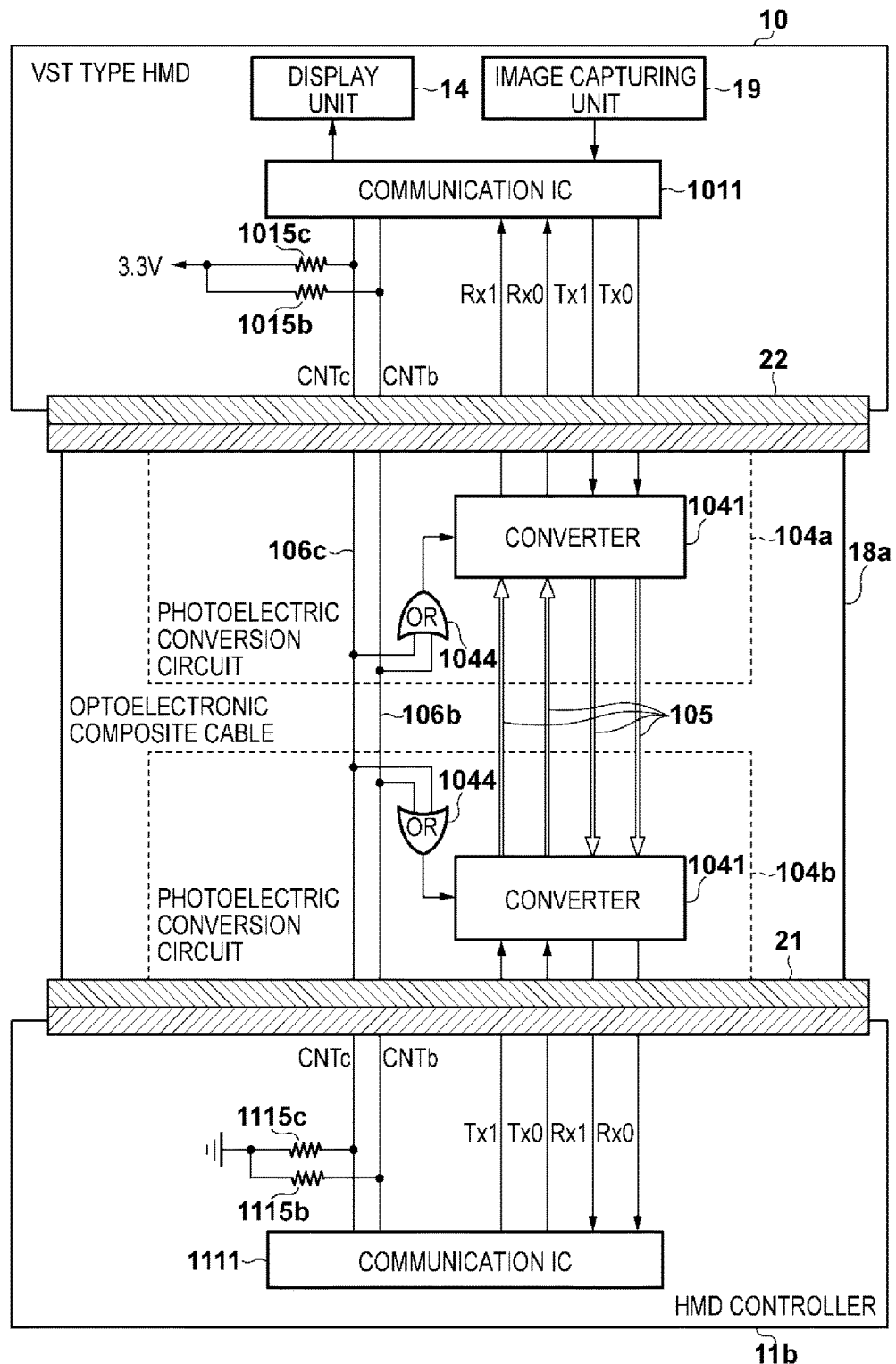

[Fig. 7]

| CONTROL SIGNAL | | IMAGE PROCESSING APPARATUS | |
|---|---|---|---|
| CNTb | CNTc | FIRST APPARATUS 20b | SECOND APPARATUS 20c |
| H | H | RIGHT- AND LEFT-EYE VIDEO DATA | SUSPENDED |
| H | L | LEFT-EYE VIDEO DATA | RIGHT-EYE VIDEO DATA |
| L | H | RIGHT-EYE VIDEO DATA | LEFT-EYE VIDEO DATA |
| L | L | SUSPENDED | SUSPENDED |

TRANSFER CONTROL APPARATUS, CONTROL METHOD, AND MIXED-REALITY PRESENTATION APPARATUS

TECHNICAL FIELD

The present invention relates to a transfer control apparatus for transferring video data captured by an image capturing and displaying apparatus to an image processing apparatus and transferring video data generated by the image processing apparatus to the image capturing and displaying apparatus, a control method for the transfer control apparatus, and a mixed-reality presentation apparatus using the transfer control apparatus.

BACKGROUND ART

There is known a mixed-reality (MR) technique of making an object (virtual object) rendered by computer graphics (CG) look as if it existed in the real world. The MR technique superimposes an image in a real space and an image in a virtual space generated by three-dimensionally modeled CG, aligns the images with each other, and displays them.

A mixed-reality presentation system (to be referred to as an "MR presentation system" hereinafter) using the MR technique is formed from the following apparatuses. That is, the system is formed from a real-image capturing apparatus (for example, a video camera) for capturing the real world, an image processing apparatus for generating a virtual space image observed from an image capturing position in the real world, and generating a mixed-reality space image (to be referred to as an "MR image" hereinafter) by compositing the images, and an image displaying apparatus for displaying the MR image. A personal computer (PC) or work station is generally used as an image processing apparatus.

As one of MR presentation systems, a system using a video see-through type head mounted display (to be referred to as "HMD" hereinafter) is known. This system captures an object by an image capturing unit whose image capturing direction is made to almost coincide with the line of sight from the pupil position of an HMD wearer (to be referred to as a "wearer" hereinafter), and presents, as an arbitrary stereoscopic image, an MR image generated using the captured image to the wearer in real time.

The HMD is required to provide a clear image closer to reality to the wearer in real time by improving the image capturing resolution and display resolution. To satisfy this requirement, it is necessary to increase the data amount of a captured image and display image, which is transmitted/received between the HMD and an HMD controller or between the HMD controller and the image processing apparatus.

A cable (to be referred to as a "metal cable" hereinafter) using metal wires as transmission media is often used to connect the HMD and the image processing apparatus. Wireless connection can be used instead of wired connection, as a matter of course. Since, however, the wireless communication band is narrow, the wireless connection is limited to an HMD which processes low-resolution images. Furthermore, to observe a video (CG and the like) from various positions or angles while the wearer wears the HMD, a relatively long cable, for example, a cable of about 10 meters is required. Since the cable length and the communication band have a trade-off relationship, if a long metal cable is used, a signal deteriorates to increase the occurrence probability of a bit error.

If a cable (to be referred to as an "optical cable" hereinafter) using optical fibers as transmission media is used, wide-band and long-distance transfer becomes possible and resistance against noise such as an electromagnetic wave also improves. However, it is necessary to adequately consider handling of the optical cable so as not to degrade a fitting portion (especially, optical fiber end faces) in a non-fitting state. Japanese Patent Laid-Open No. 2004-179733 (literature 1) proposes a cable in which a transmission module including a laser diode (LD) and LD driver and a control unit for controlling the amount of light emitted by the LD are incorporated in a connector, and a reception module including a photodiode and amplifier and a received light amount detection unit are incorporated in another connector. This cable also includes control signal lines and power supply lines between a transmission side and reception side, and is an optoelectronic composite cable obtained by compositing optical fibers and electrical signal metal wires.

Using an optoelectronic composite cable for connection between the HMD and the HMD controller or between the HMD controller and the image processing apparatus is highly advantageous since it is not necessary to mount a battery on the HMD. However, the input signal of the LD driver and the output signal of the amplifier in the optoelectronic composite cable are often differential signals, and the signals are in an AC coupling state. As a result, when the power supply is turned on, a signal having an indefinite frequency and the maximum amplitude (peak-to-peak amplitude) will be outputted in many cases. Consequently, in a state in which the reception function of an apparatus (for example, an HMD) for receiving a signal does not operate, that is, when a reception integrated circuit is in a non-operation state, a signal having an indefinite frequency may be input and cause a failure of the reception integrated circuit.

Light used for optical communication is a semiconductor laser beam of a short wavelength. When an optical cable is cut off for some reason, if optical output is continued and a person carelessly looks at a section, their eyes may be adversely affected. Therefore, it is necessary to stop optical output when an optical cable is cut off.

To solve these problems, an optical communication apparatus disclosed in Japanese Patent Laid-Open No. 2007-306213 (literature 2) starts to supply power to the photoelectric converter of an optical module upon detecting connection of the optical module and receiving a communication request from a host apparatus. In other words, it is confirmed whether optical communication is possible, and if communication is possible and a communication request is received, power supply to the photoelectric converter is started. If this method is applied to an HMD, a detection signal is transmitted even when the communication integrated circuit of a device like an HMD is in a non-operation state in order to detect the connection state of the device, and it is thus impossible to solve the problem that the communication integrated circuit may fail. In addition, since it is necessary to periodically transmit a detection signal to the device to monitor connection of the device, this method cannot be considered as an efficient method.

A technique disclosed in International Publication WO2012/105440 (literature 3) performs connection detection, and starts or interrupts power supply to a necessary photoelectric converter in accordance with the type of a connected apparatus. If this method is applied to an HMD, an optical signal is transmitted even when the communication integrated circuit of a device like an HMD is in a non-operation state in order to detect the connection state of the device, and it is thus impossible to solve the problem that the communication integrated circuit may fail.

Japanese Patent Laid-Open No. 2011-130297 (literature 4) discloses a method similar to that in literature 3, which performs connection detection, and starts or interrupts power supply to a necessary photoelectric converter in accordance with a combination of the type and state of a connected apparatus. That is, for the main purpose of saving power and preventing a transmission line from deteriorating, an optical output control circuit detects a power supply, ground, and information (connection detection, the type of a connected apparatus, a power on/off state) of connected apparatus, and starts or interrupts power supply to a photoelectric converter requiring communication. If a method of interrupting power supply to an unnecessary photoelectric converter is applied to an HMD, when power supply is restarted, it is necessary to set initial parameters and the like of the communication integrated circuit and the like, thereby taking the time to activate the apparatus. The method disclosed in literature 4 is effective when various kinds of host apparatuses and devices are variously combined. However, in an apparatus for which combinations of connections are limited, a connector with the large number of pins must be used for unnecessary control signals.

According to Japanese Patent Laid-Open No. 2001-160777 (literature 5), the current consumption of a device is detected to determine whether the device is in a communicable state. Since this method determines based on the current consumption of the device whether the device is in the communicable state, a complicated detection circuit considering a change in current consumption caused by temperature fluctuations and the like is required, thereby complicating the circuit.

SUMMARY OF INVENTION

In one aspect, a transfer control apparatus for transferring video data obtained by image capturing in an image capturing and displaying apparatus, which has an image capturing unit and a display unit, to an image processing apparatus, and transferring video data generated by the image processing apparatus to the image capturing and displaying apparatus, the transfer control apparatus comprising: a transfer unit having a first converter configured to output an optical signal converted from an electrical signal representing the video data, an optical fiber for transferring the optical signal, and a second converter configured to output an electrical signal converted from the optical signal transferred by the optical fiber; and a metal wire for transferring a control signal indicating whether it is possible to communicate the video data by a communication unit of the image capturing and displaying apparatus, wherein operations of the first and second converters are controlled based on the control signal.

In another aspect, a transfer control apparatus for transferring video data obtained by image capturing in an image capturing and displaying apparatus, which has an image capturing unit and a display unit, to a plurality of image processing apparatuses, and transferring video data generated by at least one of the plurality of image processing apparatuses to the image capturing and displaying apparatus, the transfer control apparatus comprising: a transfer unit having a first converter configured to output an optical signal converted from an electrical signal representing the video data, an optical fiber for transferring the optical signal, and a second converter configured to output an electrical signal converted from the optical signal transferred by the optical fiber; and a plurality of metal wires for transferring first and second control signals, wherein operations of the first and second converters are controlled based on at least one of the first and second control signals.

In other aspect, a mixed-reality presentation apparatus comprising the image capturing and displaying apparatus, the image processing apparatus, and the transfer control apparatus, described in above.

In other aspect, a control method of a transfer control apparatus for transferring video data obtained by image capturing in an image capturing and displaying apparatus, which has an image capturing unit and a display unit, to an image processing apparatus, and transferring video data generated by the image processing apparatus to the image capturing and displaying apparatus, wherein the transfer control apparatus comprises: a transfer unit having a first converter configured to output an optical signal converted from an electrical signal representing the video data, an optical fiber for transferring the optical signal, and a second converter configured to output an electrical signal converted from the optical signal transferred by the optical fiber; and a metal wire for transferring a control signal indicating whether it is possible to communicate the video data by a communication unit of the image capturing and displaying apparatus, the method comprising controlling operations of the first and second converters based on the control signal.

In other aspect, a control method of a transfer control apparatus for transferring video data obtained by image capturing in an image capturing and displaying apparatus, which has an image capturing unit and a display unit, to a plurality of image processing apparatuses, and transferring video data generated by at least one of the plurality of image processing apparatuses to the image capturing and displaying apparatus, wherein the transfer control apparatus comprises: a transfer unit having a first converter configured to output an optical signal converted from an electrical signal representing the video data, an optical fiber for transferring the optical signal, and a second converter configured to output an electrical signal converted from the optical signal transferred by the optical fiber; and a plurality of metal wires for transferring first and second control signals, the method comprising controlling operations of the first and second converters based on at least one of the first and second control signals.

According to the aspects, it is possible to control output of an optical signal and electrical signal in a transfer control apparatus in accordance with the state of a control signal.

Further features of the present invention will become apparent from the following description of exemplary embodiments with reference to the attached drawings.

BRIEF DESCRIPTION OF DRAWINGS

FIG. 1 is a view for explaining the arrangement of a video see-through type head mounted display.

FIG. 2 is a view for explaining the basic arrangement of a mixed-reality presentation apparatus using an HMD.

FIG. 3 is a view for explaining the arrangement of a mixed-reality presentation apparatus according to the first embodiment.

FIG. 4 is a flowchart for explaining the operation of a photoelectric conversion circuit.

FIG. 5 is a view for explaining the arrangement of a mixed-reality presentation apparatus according to the second embodiment.

FIG. 6 is a view showing the arrangements of an HMD, optoelectronic composite cable, and HMD controller according to the second embodiment.

FIG. 7 is a table for explaining the relationship between a combination of the states of a plurality of control signals and the operations of a plurality of image processing apparatuses.

DESCRIPTION OF EMBODIMENTS

A transfer control apparatus, a control method therefor, and a mixed-reality presentation apparatus using the transfer control apparatus according to embodiments of the present invention will be described in detail below with reference to the accompanying drawings. Note that the embodiments are not intended to limit the present invention to the scope of the claims, and not all of the combinations of arrangements set forth in the embodiments are necessarily required with respect to solve the problems according to the present invention.

First Embodiment

HMD

The arrangement of a video see-through type head mounted display (HMD) will be described with reference to FIG. 1. Referring to FIG. 1, an image capturing unit 19 for capturing the real world includes an image capturing device 13 and an image capturing optical system 15, and light beams which externally enter are guided to the image capturing device 13 by the image capturing optical system 15 including a lens and prism, and form an image on the image capturing device 13. Furthermore, an image displayed on a display unit 14 is guided to a pupil 17 of a wearer of the HMD by a display optical system (free-form surface prism) 16. That is, the image capturing unit 19 captures a real space which almost coincides with the line-of-sight direction from the pupil position of the wearer and an image displayed on the display unit 14 is guided to the pupil 17 of the wearer, thereby presenting a mixed-reality space image (MR image) to the wearer.

It is possible to display, on the display unit 14, an image in a direction in which the wearer faces, by using, as an MR image displaying apparatus, an HMD serving as an image capturing and displaying apparatus for which the line of sight from the pupil position of the wearer and the image capturing direction of a camera are made to almost coincide with each other, instead of a normal monitor. Furthermore, since it is possible to display a computer graphics (CG) image in a direction in which the wearer faces, it is possible to enhance the feeling of the wearer as if their existed in a mixed-reality space.

MR Presentation Apparatus

The basic arrangement of the mixed-reality presentation apparatus (MR presentation apparatus) using an HMD will be described with reference to FIG. 2. Referring to FIG. 2, an HMD controller 11 controls an HMD 10 for capturing a real image and displaying an MR image. An image processing apparatus 20 generates an MR image by superimposing a virtual space image on the real space image captured by the HMD 10, and supplies the MR image to the HMD controller 11. A displaying apparatus 30 connected to the HMD controller 11 is necessary when a person other than the wearer shares a mixed-reality experience or an MR image to be presented to the wearer is confirmed.

FIG. 2 shows an example in which the HMD 10 and the HMD controller 11 are separate hardware components but they can be integrated by incorporating the HMD controller 11 in the HMD 10. Alternatively, by incorporating the HMD controller 11 in the image processing apparatus 20, the HMD 10 and the displaying apparatus 30 can be directly connected to the image processing apparatus 20. In FIG. 2, a cable 18 which connects the HMD 10 and the HMD controller 11 corresponds to a transfer control apparatus according to the embodiment, and a detailed description thereof will be provided later.

In the MR presentation apparatus, to display a CG image and a real space image to have a correct positional relationship even if the viewpoint position of the image capturing unit 19 of the HMD 10 changes, the HMD 10 includes a detection unit (for example, a position and orientation sensor) for detecting the viewpoint position or the line-of-sight direction.

The image processing apparatus 20 arranges a three-dimensionally modeled virtual object in a virtual space of the same scale as that of the real space, and renders the virtual object observed from, for example, the viewpoint position or line-of-sight direction detected by the position and orientation sensor, thereby generating a CG image. By superimposing the generated CG image and the real space image, it is possible to present an MR image in which the virtual object is correctly disposed in the real space even if the virtual object is observed from any viewpoint position or line-of-sight direction. As a result, the wearer can experience, through the HMD 10, an MR world in which the real space image and the virtual space image (CG image) are superimposed.

The HMD controller 11 includes an external output interface capable of outputting, to the external displaying apparatus 30, the same image (the image observed from the viewpoint of the wearer) as that seen by the wearer. The HMD controller 11 outputs, to the external output interface, one of a left-eye image and right-eye image which are output from the image processing apparatus 20. As a result, it is possible to provide the image currently observed by the wearer to an audience other than the wearer through the displaying apparatus 30, and allow the audience to understand and share the MR experienced by the wearer at the same time.

Instead of the video see-through type (to be referred to as "VST type" hereinafter) HMD, an optical see-through type (to be referred to as "OST type" hereinafter) HMD is also used. The VST type HMD superimposes a CG image on a video captured by the camera, and projects the obtained image in front of the eyes of the wearer, and the wearer observes the processed video image. To the contrary, since the wearer of the OST type HMD observes the real space image through an optical system such as a half mirror without intervention of the camera, the wearer can observe the real space image closer to reality. However, since the OST type HMD projects a CG image through glass (a half mirror or the like), the CG image often looks transparent and the wearer may feel a lack of reality.

The VST type HMD is suitable for image processing, since the composite result of a real space image and a CG image hardly varies. That is, to avoid the time delay of CG rendering (the difference between a photographing timing and a CG rendering timing), the VST type HMD can output a composite video in advance to further improve reality.

Since it is possible to seamlessly merge the real world and virtual world, the VST type HMD is often used for the MR presentation system. In addition to the MR presentation system, the HMD is widely used in various fields and applications such as car navigation, design/manufacturing/ production sites, work/construction sites, entertainment, medical care, education, and various events.

Connection Cable

An active optical cable (to be referred to as an "AOC" hereinafter) in which a photoelectric converter is incorporated in a connector is used for data communication between the HMD 10 and the HMD controller 11 (or between the HMD controller 11 and the image processing apparatus 20). Furthermore, an optoelectronic composite cable formed by combining a plurality of metal wires with the AOC is used to, for example, supply a power supply voltage to the HMD or monitor an operation state.

The use of the optoelectronic composite cable can transmit/receive a captured image and display image by optical communication, thereby obtaining a high transfer rate (for example, about 5 to 10 Gigabits/second) and implementing long-distance transfer (for example, about 10 to 30 meters). By using the AOC incorporating the photoelectric converter, the fitting portion of the connector may be handled in almost the same manner as for the metal cable, and the HMD user can freely attach/detach the cable. For example, when it becomes necessary to replace the cable due to wear or the like, it is easy to replace the cable.

Furthermore, by controlling output of the photoelectric converter using an operation state monitoring control line for notifying the outside of the operation state of the HMD, it is possible to prevent an indefinite signal from being input to the communication integrated circuit while power supply is stopped within the HMD. That is, a simple control circuit prevents an indefinite signal from being input to the communication integrated circuit, thereby making it possible to use an HMD having a battery-less and wire-saving arrangement. Even if the optoelectronic composite cable is cut off, optical output can be reliably stopped.

Arrangement of MR Presentation Apparatus

The arrangement of the MR presentation apparatus according to the first embodiment will be described with reference to FIG. 3. The VST type HMD 10 and the HMD controller 11 are connected through the optoelectronic composite cable 18, thereby forming the MR presentation apparatus. The HMD controller 11 may be separated from the image processing apparatus 20 or incorporated in the image processing apparatus 20. Note that the VST type HMD 10 will be simply referred to as the "HMD 10" hereinafter.

A photoelectric conversion circuit 104a is incorporated in a connector 22 corresponding to an end portion of the optoelectronic composite cable 18, and a photoelectric conversion circuit 104b is incorporated in a connector 21 corresponding to an end portion of the optoelectronic composite cable 18. The optoelectronic composite cable 18 functions as an interface cable between the HMD 10 and an external apparatus. Note that the arrangement of the HMD 10 shown in FIG. 3 is obtained by mainly extracting only an interface portion with the HMD controller 11.

A communication integrated circuit (to be referred to as a "communication IC" hereinafter) 1011 of the HMD 10 includes a plurality of input/output (I/O) ports for inputting/outputting a plurality of data and a control signal. The above-described image capturing unit 19 and display unit 14 are connected to the I/O ports, and the communication IC 1011 receives video data acquired by image capturing of the image capturing unit 19, and outputs video data to be displayed to the display unit 14.

Transmission signal lines Tx0 and Tx1 and reception signal lines Rx0 and Rx1 are connected to the I/O ports, and captured video data and a control signal are transmitted to a converter 1041 of the photoelectric conversion circuit 104a through the transmission signal lines Tx0 and Tx1. Furthermore, video data to be displayed and a control signal are received from the converter 1041 of the photoelectric conversion circuit 104a through the reception signal lines Rx0 and Rx1. The transmission signal lines Tx0 and Tx1 and the reception signal lines Rx0 and Rx1 may be parallel signal lines or serial signal lines, and may use a single-ended scheme or differential scheme.

FIG. 3 shows an example in which two optical fibers 105 are used for a transfer system for transmission and two optical fibers 105 are used for a transfer system for reception, that is, four optical fibers 105 in total are used. However, the number of optical fibers 105 is arbitrary. If a plurality of image capturing devices 19a and 19b exist in the image capturing unit 19 of the HMD 10, video data from the image capturing devices 19a and 19b can be multiplexed, and transmitted to the HMD controller 11 using one or a plurality of optical fibers. Similarly, if a plurality of display devices 14a and 14b exist in the display unit 14 of the HMD 10, video data to be supplied to the display devices 14a and 14b can be multiplexed, and transmitted from the HMD controller 11 using one or a plurality of optical fibers. Similarly to multiplexing of video data, various control signals including the signal of the position and orientation sensor can be multiplexed on a signal passing through the optical fiber, thereby decreasing the number of signal lines.

The HMD 10 includes a power supply switch (not shown) for starting or stopping power supply to the respective units of the HMD 10. When the power supply switch is pressed while the HMD 10 is in a non-operation state (that is "power-on"), power supply to the respective units of the HMD 10 is started to activate the HMD 10. To the contrary, when the power supply switch is pressed while the HMD 10 is in the operation state (that is "power-off"), power supply to the respective units of the HMD 10 is stopped to terminate the operation of the HMD 10.

The HMD 10 is supplied with an external power supply voltage (for example, DC 12 V) from the HMD controller 11 (or the image processing apparatus 20) through the optoelectronic composite cable 18. Upon power-on, a regulator (not shown) in the HMD 10 supplies, to the respective units of the HMD 10, an internal power supply voltage (for example, DC 3.3 V) stepped-down from the external power supply voltage.

A signal line (to be referred to as a "control signal line" hereinafter) 106 of a control signal CNT is pulled up to an internal power supply line by a resistor 1015 (for example, 1 kΩ). Note that the control signal line 106 is a metal wire, and it is necessary to maintain the level of the control signal CNT not to readily change even if external noise is received. To do this, a noise suppression component (Zener diode, varistor, or the like) is connected to the control signal line 106, or filtering processing or the like is performed within the communication IC 1011 which receives the control signal CNT.

The control signal line 106 is also connected to an output terminal of the communication IC 1011, and the output terminal connects to an internal switch which is normally closed of the communication IC 1011, thus the output terminal connected to the ground normally. Therefore, the state of the control signal CNT is maintained at low level (inactive) immediately after supply of the internal power supply voltage by the regulator is started. After that, when the communication IC 1011 opens the internal switch connected to the output terminal, the state of the control signal CNT is set at high level (active). For example, if supply of the internal power supply voltage of the HMD 10 is started and the communication IC 1011 is in a communication preparation stage, the communication IC 1011 maintains the state of the control signal CNT inactive by maintaining a closed state of the internal switch. After that, when the communication becomes possible, the communication IC 1011 makes the state of the control signal CNT active by changing a state of the internal switch from the closed state to an open state.

The communication preparation stage indicates a stage before a normal operation is performed, for example, a stage in which a program is being written from an external read only memory (ROM) or the like into the communication IC 1011. A communication disable state includes a state in which the communication IC 1011 is not receiving video data from the image capturing unit 19, such as an initialization state, idling state, and error occurrence state of the image capturing unit 19. The communication disable state also includes a state in which the display unit 14 that has received video data from the communication IC 1011 cannot display the received video data, such as an initialization state, idling state, and error occurrence state of the display unit 14.

When transmitting video data of a plurality of image capturing units 19 by one optical fiber, if at least one of the image capturing units 19 can perform a normal operation, communication may be started. In this case, the communication speed of signal may be decreased, as compared with that in the normal operation. Similarly, when transmitting the video data of a plurality of display units 14 by one optical fiber, if at least one of the display units 14 can perform a normal operation, communication may be started. In this case, the communication speed of signal may be decreased, as compared with that in the normal operation.

The HMD 10 and the optoelectronic composite cable 18 are connected by the connector 22, and the optoelectronic composite cable 18 and the HMD controller 11 are connected by the connector 21. As the connectors 21 and 22, interface connectors which have high insertion/removal durability and are suitable for connection between apparatuses are preferably used but other connectors may be used. Note that FIG. 3 shows an example in which the transmission and reception signal lines Tx0 and the like and the control signal line 106 are connected through the connectors 21 and 22. Although not shown, an external power supply line and a ground line may be connected through the connectors 21 and 22. The connectors may be separated into connectors for transmission and reception signal lines Tx0 and the like and connectors for the control signal line 106, external power supply line, and ground line, and these connectors may be inserted/removed almost simultaneously.

Each of the photoelectric conversion circuits 104a and 104b includes the converter 1041 for converting an optical signal into an electrical signal and converting an electrical signal into an optical signal, a microprocessor (CPU) (not shown) for making various settings and executing control, and a regulator for supplying the internal power supply voltage to the converter 1041 and the like.

The arrangement of the HMD controller 11 shown in FIG. 3 is obtained by mainly extracting only an interface portion with the HMD 10. A communication IC 1111 of the HMD controller 11 includes a plurality of I/O ports for inputting/outputting a plurality of data and a control signal. The transmission signal lines Tx0 and Tx1 and the reception signal lines Rx0 and Rx1 are connected to the I/O ports, and video data to be displayed and a control signal are transmitted to the converter 1041 of the photoelectric conversion circuit 104b through the transmission signal lines Tx0 and Tx1. Furthermore, captured video data and a control signal are received from the converter 1041 of the photoelectric conversion circuit 104b through the reception signal lines Rx0 and Rx1. As described above, the transmission signal lines Tx0 and Tx1 and the reception signal lines Rx0 and Rx1 may be parallel signal lines or serial signal lines, and may use single-ended scheme or differential scheme.

The control signal line 106 is connected to the input terminal of the communication IC 1111, and is pulled down to a ground potential by a resistor 1115 to protect the input at the time of non-connection of the optoelectronic composite cable 18. Note that the resistance value of the resistor 1115 is desirably set to 10 times (for example, 10 kΩ) or more the resistance value of the resistor 1015 so as to reliably make the state of the control signal CNT active.

Operation of Photoelectric Conversion Circuit

FIG. 4 is a flowchart for explaining the operation of each of the photoelectric conversion circuits 104a and 104b. The operation shown in FIG. 4 starts upon activation of the HMD controller 11. Note that the activation of the HMD controller 11 is linked with activation of the image processing apparatus 20.

When the HMD controller 11 is activated, a power supply is supplied to the photoelectric conversion circuits 104a and 104b and the HMD 10 through the power supply line, the regulators of the photoelectric conversion circuits 104a and 104b start to supply, to corresponding converter 1041, the internal power supply having a voltage stepped-down from the external power supply voltage (S11). Each converter 1041 which has started to operate determines the state of the control signal CNT (S12). At this time, the HMD 10 has not been powered on, the state of the control signal CNT is inactive, each converter 1041 becomes a standby state in which none of an optical signal and an electrical signal are output (S13), and the operation returns to step S12. That is, until the power supply switch of the HMD 10 is pressed, the operations in steps S12 and S13 are repeated.

When the power supply switch is pressed, the regulator of the HMD 10 starts to supply, to the respective units of the HMD 10, the internal power supply having a voltage stepped-down from the external power supply voltage (power-on). After power-on, for example, if the communication IC 1011 becomes a communicable state, the state of the control signal CNT is made active, and the operation transits from step S12 to step S14. After the state of the control signal CNT is made active, each converter 1041 starts output of an optical signal and electrical signal, and becomes the operation state (S14), and then the HMD 10 becomes usable.

After each converter 1041 becomes the operation state, it determines the state of the control signal CNT (S15). If the state of the control signal CNT is active, the determination processing in step S15 is repeated. When the power supply switch is pressed again, the regulator of the HMD 10 stops supplying, to the respective units of the HMD 10, the internal power supply having the voltage stepped-down from the external power supply voltage (power-off), the state of the control signal CNT is made inactive, and the operation transits from step S15 to step S16. After the state of the control signal CNT is made inactive, each converter 1041 stops output of the optical signal and electrical signal (S16), and the operation returns to step S12.

Note that power supply to the photoelectric conversion circuits 104a and 104b and the HMD 10 through the internal power supply line is stopped upon, for example, power-off of the HMD controller 11, thereby terminating the operation shown in FIG. 4.

When each converter 1041 performs the operation shown in FIG. 4 during the operation of the HMD controller 11, it is possible to prevent an indefinite signal from being input to the communication IC 1011 while the HMD 10 is in the power-off state. Furthermore, since supply of the internal power supply voltage to the photoelectric conversion circuits 104*a* and 104*b* is not interrupted, it is possible to shorten the return time of the MR presentation apparatus when only the HMD 10 transits from the power-off state to the power-on state. If the optoelectronic composite cable 18 is cut off, supply of the external power supply voltage from the HMD controller 11 to the HMD 10 is interrupted, and thus the state of the control signal CNT is made inactive to stop output of the optical signal and electrical signal.

As described above, the optoelectronic composite cable 18 including the photoelectric conversion circuits 104*a* and 104*b* functions as a transfer control apparatus in a cable form which controls transfer through the optical fibers 105 by controlling output of the optical signal and electrical signal in accordance with the state of the control signal CNT.

Modification of First Embodiment

It is possible to control switching of the optical fiber to cope with a failure by using a plurality of optical fibers for each of transmission and reception. For example, data of a fixed pattern is transferred in a predetermined cycle by each optical fiber, and it is determined whether data matching the fixed pattern has been received. If data which does not match the fixed pattern is often received in a given optical fiber, it is determined that a failure has occurred in the system of the optical fiber, and data communication is continued using the remaining optical fibers. At this time, video data of a resolution lower than that in the normal state is transferred, as needed. This can avoid the problem that the MR presentation apparatus suddenly becomes unusable due to a failure of the cable or the like.

Instead of periodically performing failure diagnosis, it may be performed at irregular intervals, for example, immediately after power-on. The fixed pattern and the number (criterion) of data mismatches for determining that a failure has occurred can be arbitrarily set, as a matter of course.

Second Embodiment

A transfer control apparatus and a control method therefor according to the second embodiment of the present invention will be described below. Note that in the second embodiment, the same reference numerals as those in the first embodiment denote the same components and a detailed description thereof may be omitted.

If the data amount of a CG image to be superimposed on a captured image is large, the real-time characteristic may be lost with the throughput of one image processing apparatus 20, and thus a method of supplying video data from a plurality of image processing apparatuses 20*b* and 20*c* to one HMD 10 is used. For example, the real time characteristic is improved when the first image processing apparatus 20*b* generates a left-eye image and the second image processing apparatus 20*c* generates a right-eye image. In the second embodiment, an MR presentation apparatus for supplying video data from the two image processing apparatuses 20*b* and 20*c* to the one HMD 10 will be described.

The arrangement of the MR presentation apparatus according to the second embodiment will be described with reference to FIG. 5. In the MR presentation apparatus according to the second embodiment, the one HMD 10 and two HMD controllers 11*b* and 11*c* are connected through a plurality of optoelectronic composite cables 18*a*, 18*b*, and 18*c*. Each of the HMD controllers 11*b* and 11*c* may be separated from a corresponding one of the image processing apparatuses 20*b* and 20*c*, or incorporated in a corresponding one of the image processing apparatuses 20*b* and 20*c*.

As shown in FIG. 5, the other end of the optoelectronic composite cable 18*a* connected to the HMD 10 is connected to a connection unit 23. The connection unit 23 is connected to the two HMD controllers 11*b* and 11*c* by the two optoelectronic composite cables 18*b* and 18*c*. Although not shown, for example, the HMD controller 11*b* supplies an external power supply voltage to the optoelectronic composite cables 18*a* and 18*b* and the HMD 10, and the HMD controller 11*c* supplies the external power supply voltage to the optoelectronic composite cable 18*c*. The HMD controller 11*c* may also supply the external power supply voltage to the optoelectronic composite cable 18*a* and the HMD 10, as a matter of course.

FIG. 6 shows the arrangements of the HMD 10, optoelectronic composite cable 18*a*, and HMD controller 11*b* according to the second embodiment. Note that for the sake of simplicity, FIG. 6 shows none of the connection unit 23, optoelectronic composite cables 18*b* and 18*c*, and HMD controller 11*c*. However, it is to be understood that the connection unit 23 is connected between a connection pair of connectors 21. The optoelectronic composite cables 18*a*, 18*b*, and 18*c* have the same arrangement and the HMD controllers 11*b* and 11*c* have the same arrangement.

Unlike the arrangement shown in FIG. 3, two control signal lines 106*b* and 106*c* are provided to transfer two control signals CNTb and CNTc. In order for each converter 1041 to determine the states of the control signals, an OR gate 1044 for logical summing the states of the two control signals CNTb and CNTc is added to each of the photoelectric conversion circuits 104*a* and 104*b*.

Referring to FIG. 6, both of the two control signals CNTb and CNTc are input to a communication IC 1111 of the HMD controller 11*b*. However, only the control signal CNTb is input to the communication IC 1111 of the HMD controller 11*b* by the connection unit 23. That is, as shown in FIG. 5, the connection unit 23 distributes the control signal CNTb to the HMD controller 11*b*, and distributes the control signal CNTc to the HMD controller 11*c*.

Similarly, referring to FIG. 6, both transmission signal lines Tx0 and Tx1 of the HMD controller 11*b* are connected to the optoelectronic composite cable 18*a*. However, the connection unit 23 connects only the transmission signal line Tx0 to the optoelectronic composite cable 18*a*. That is, as shown in FIG. 5, the connection unit 23 connects the transmission signal line Tx0 of the HMD controller 11*b* to the optoelectronic composite cable 18*a*, and connects the transmission signal line Tx1 of the HMD controller 11*c* to the optoelectronic composite cable 18*a*. Furthermore, the transmission signal line Tx1 of the HMD controller 11*b* and the transmission signal line Tx0 of the HMD controller 11*c* are opened by the connection unit 23. Therefore, it is possible to display, on a display unit 14, for example, video data supplied from the HMD controller 11*b* as a left-eye image and video data supplied from the HMD controller 11*c* as a right-eye image.

On the other hand, since captured video data needs to be supplied to the two image processing apparatuses 20*b* and 20*c*, both reception signal lines Rx0 and Rx1 of the HMD controller 11*b* are connected to the optoelectronic composite cable 18*a*. Similarly, both reception signal lines Rx0 and Rx1 of the HMD controller 11c are also connected to the optoelectronic composite cable 18a.

A communication IC 1011 of the HMD 10 can control the states of the control signals CNTb and CNTc. For example, the display unit 14 of the left-eye image is in a normal operation state but the state of the control signal CNTb is made active and the state of the control signal CNTc is made inactive in, for example, the initialization state, idling state, or error occurrence state of the display unit 14 of the right-eye image. In this case, photoelectric conversion circuits 104a and 104b of the optoelectronic composite cable 18c for transferring video data of a right-eye image are set in an output stop state. On the other hand, photoelectric conversion circuits 104a and 104b of the optoelectronic composite cable 18b for transferring video data of a left-eye image are maintained in an operation state. Photoelectric conversion circuits 104a and 104b of the optoelectronic composite cable 18a are also maintained in an operation state, as a matter of course.

As described above, according to the second embodiment, the transfer control apparatus is formed by the connection unit 23 and a set of the plurality of optoelectronic composite cables 18 connected to the connection unit 23.

Modification of Second Embodiment

Although FIG. 5 shows an example in which the connection unit 23 connects one of the control signals to the HMD controller 11, both the control signals can be connected to the HMD controller 11. Similarly, although an example in which the connection unit 23 connects one of the transmission signal lines to the HMD controller 11 has been explained, both the transmission signal lines can be connected to the HMD controller 11. In this case, it is possible to control the operation of each of the image processing apparatuses 20b and 20c by controlling a combination of the states of the control signals using the communication IC 1011 of the HMD 10.

The relationship between a combination of the states of the plurality of control signals and the operations of the plurality of image processing apparatuses 20b and 20c will be described with reference to FIG. 7. Note that "H" indicates that the state of the control signal is active (high level), and "L" indicates that the state of the control signal is inactive (low level).

If the states of the two control signals are at "H", the image processing apparatus 20b generates right- and left-eye video data and the other image processing apparatus 20c suspends generation of video data. If the state of the control signal CNTb is at "H" and the state of the control signal CNTc is at "L", the image processing apparatus 20b generates left-eye video data, and the other image processing apparatus 20c generates right-eye video data. If the state of the control signal CNTb is inverted to "L" and the state of the control signal CNTc is inverted to "H", the image processing apparatus 20b generates right-eye video data and the other image processing apparatus 20c generates left-eye video data.

If the states of the two control signals are at "L", both the image processing apparatuses 20b and 20c suspend generation of video data, as a matter of course. Note that for example, it is possible to control to supply a power supply voltage from the side of the image processing apparatus 20b which generates right- and left-eye video data or left-eye video data.

For example, a switch operable by the wearer is disposed in the HMD 10. The communication IC 1011 switches the states of the control signals in accordance with the state of the switch. If the wearer feels a lack of the real-time characteristic with the one image processing apparatus 20b, the wearer can cause the two image processing apparatuses 20b and 20c to generate video data by operating the switch. Furthermore, if the wearer feels that the right and left images are displayed at horizontally opposite positions, the wearer can switch the right and left images by operating the switch, and determine whether the right and left images are correctly supplied, thereby obtaining a correct display state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-041776 filed Mar. 3, 2015 and No. 2015-228095 Filed Nov. 20, 2015 which are hereby incorporated by reference herein in their entirety.

The invention claimed is:

1. A transfer cable for transferring video data obtained by image capturing in an image capturing and displaying apparatus, to an image processing apparatus, and transferring video data generated by the image processing apparatus to the image capturing and displaying apparatus, the transfer cable comprising:

a transfer unit having a first converter configured to output an optical signal converted from an electrical signal representing the video data, an optical fiber for transferring the optical signal, and a second converter configured to output an electrical signal converted from the optical signal transferred by the optical fiber; and a control signal line for transferring a control signal indicating whether the image capturing and displaying apparatus is able to communicate the video data, to the first and second converters, wherein, when power of the image capturing and displaying apparatus is turned on, the control signal keeps in an inactive state until the image capturing and displaying apparatus becomes able to communicate, and while the image capturing and displaying apparatus is able communicate, the control signal keeps in an active state until the power of the image capturing and displaying apparatus is turned off, wherein, in a case when the state of the control signal is changed from the inactive state to the active state, the first converter initiates the output of the optical signal and the second converter initiates the output of the electrical signal, and wherein, in a case when the state of the control signal is changed from the active state to the inactive state, the first converter terminates the output of the optical signal and the second converter terminates the output of the electrical signal.

2. The transfer cable according to claim 1, wherein, in a case when disconnecting a connection between the image capturing and display apparatus and the transfer cable, the control signal is in the inactive state.

3. The transfer cable according to claim 1, wherein the transfer unit comprises a first transfer system to transfer the captured video data, and a second transfer system to transfer the generated video data.

4. The transfer cable according to claim 3, wherein the image capturing and displaying apparatus has a plurality of image capturing devices, and wherein, in the first transfer system, a plurality of first video data obtained by the plurality of image capturing devices are multiplexed, and the multiplexed first video data is transferred using a number of optical fiber less than a number of the image capturing devices.

5. The transfer cable according to claim 3, wherein the image capturing and displaying apparatus has a plurality of display devices, and wherein, in the second transfer system, a plurality of second video data supplied to the plurality of display devices are multiplexed, and the multiplexed second video data is transferred using a number of optical fiber less than a number of the display devices.

6. The transfer cable according to claim 1, wherein the metal wire is connected to an internal power supply through a register in the image capturing and displaying apparatus, and is connected to a ground through a register in a side of the image processing apparatus.

7. A transfer control method for transferring video data obtained by image capturing in an image capturing and displaying apparatus, to an image processing apparatus, and transferring video data generated by the image processing apparatus to the image capturing and displaying apparatus, via a transfer cable including a transfer unit having a first converter configured to output an optical signal converted from an electrical signal representing the video data, an optical fiber for transferring the optical signal, and a second converter configured to output an electrical signal converted from the optical signal transferred by the optical fiber; and a control signal line for transferring a control signal indicating whether the image capturing and displaying apparatus is able to communicate the video data to the first and second converters, the method comprising:

when power of the image capturing and displaying apparatus is turned on, keeping the control signal in an inactive state until the image capturing and displaying apparatus becomes able to communicate, and while the image capturing and displaying apparatus is able communicate, keeping the control signal in an active state until the power of the image capturing and displaying apparatus is turned off, when the state of the control signal is changed from the inactive state to the active state, initiating the output of the optical signal by the first converter and initiating the output of the electrical signal by the second converter, and when the state of the control signal is changed from the active state to the inactive state, terminating the output of the optical signal by the first converter and terminating the output of the electrical signal by the second converter.

* * * * *